July 30, 1963
O. A. WANDEL
3,099,011
PNEUMATICALLY OPERATED TACKER
Filed Aug. 11, 1955
4 Sheets-Sheet 1
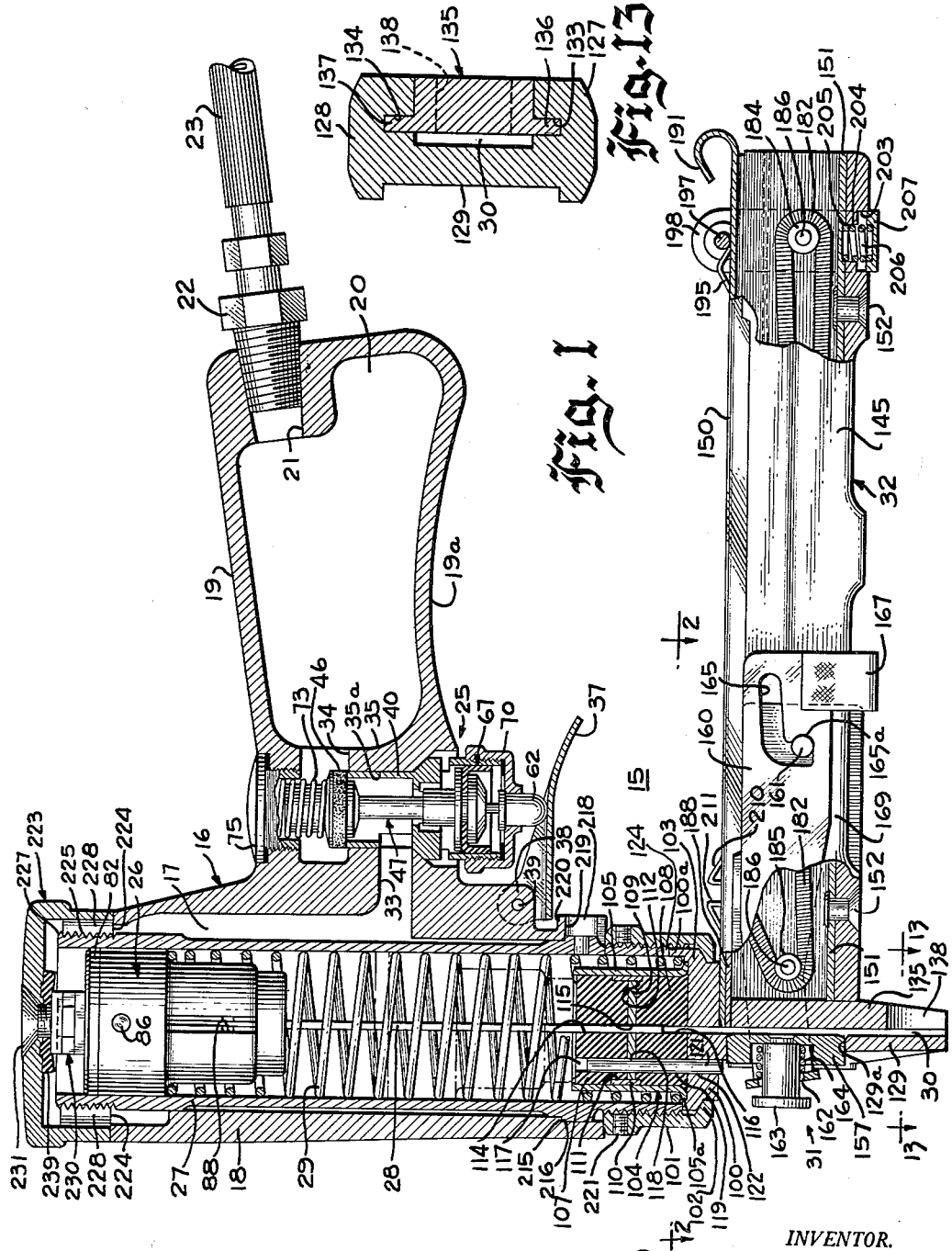
INVENTOR.
OSCAR A. WANDEL
BY
ATTORNEYS

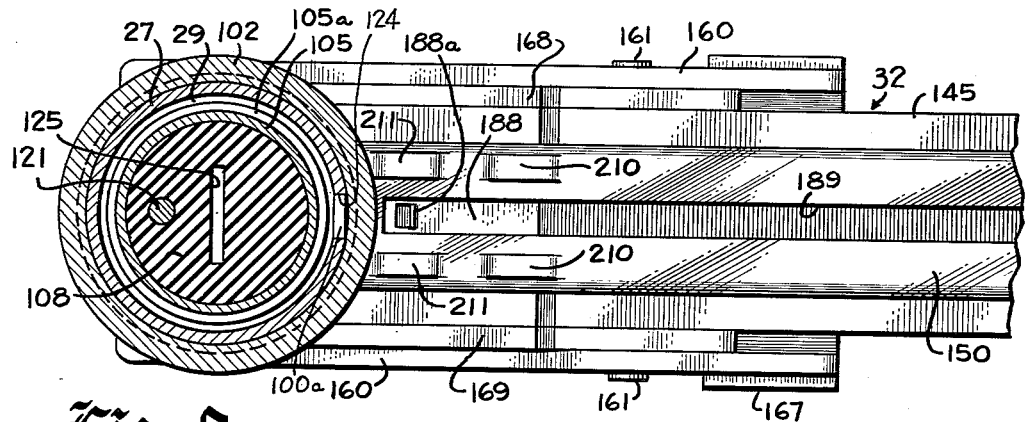
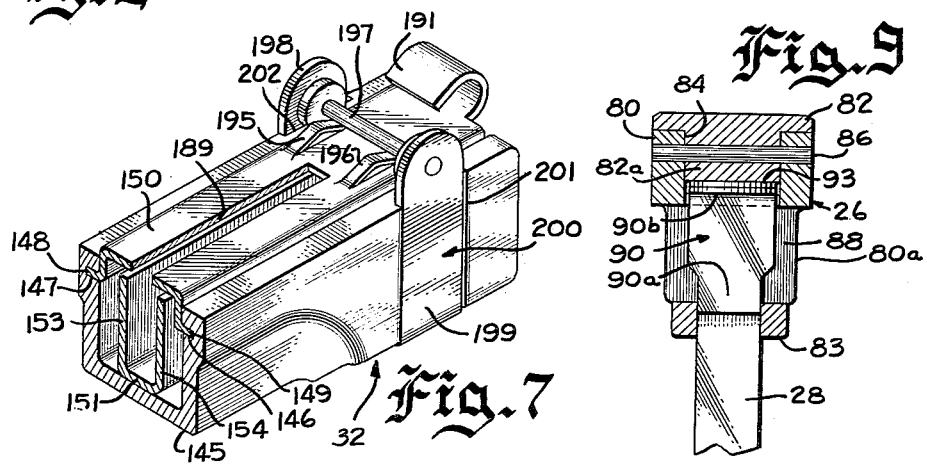
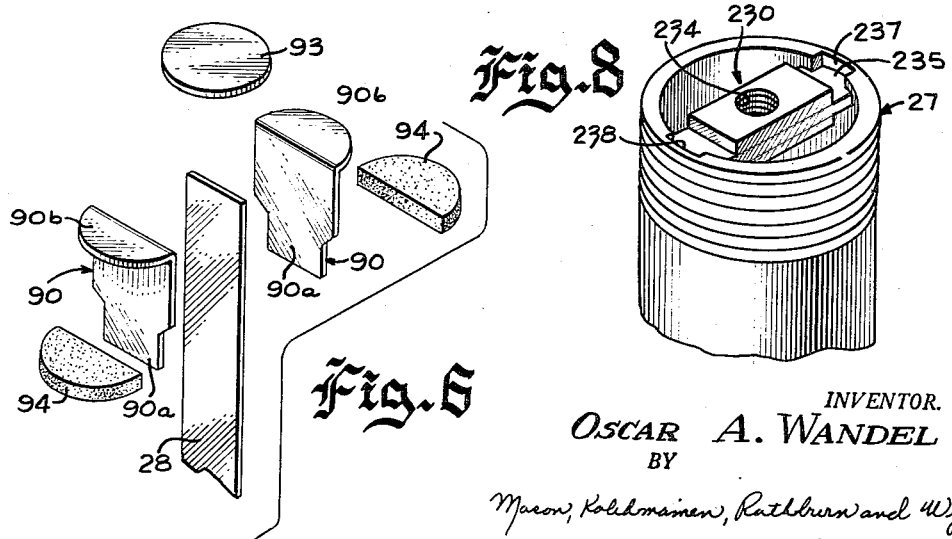

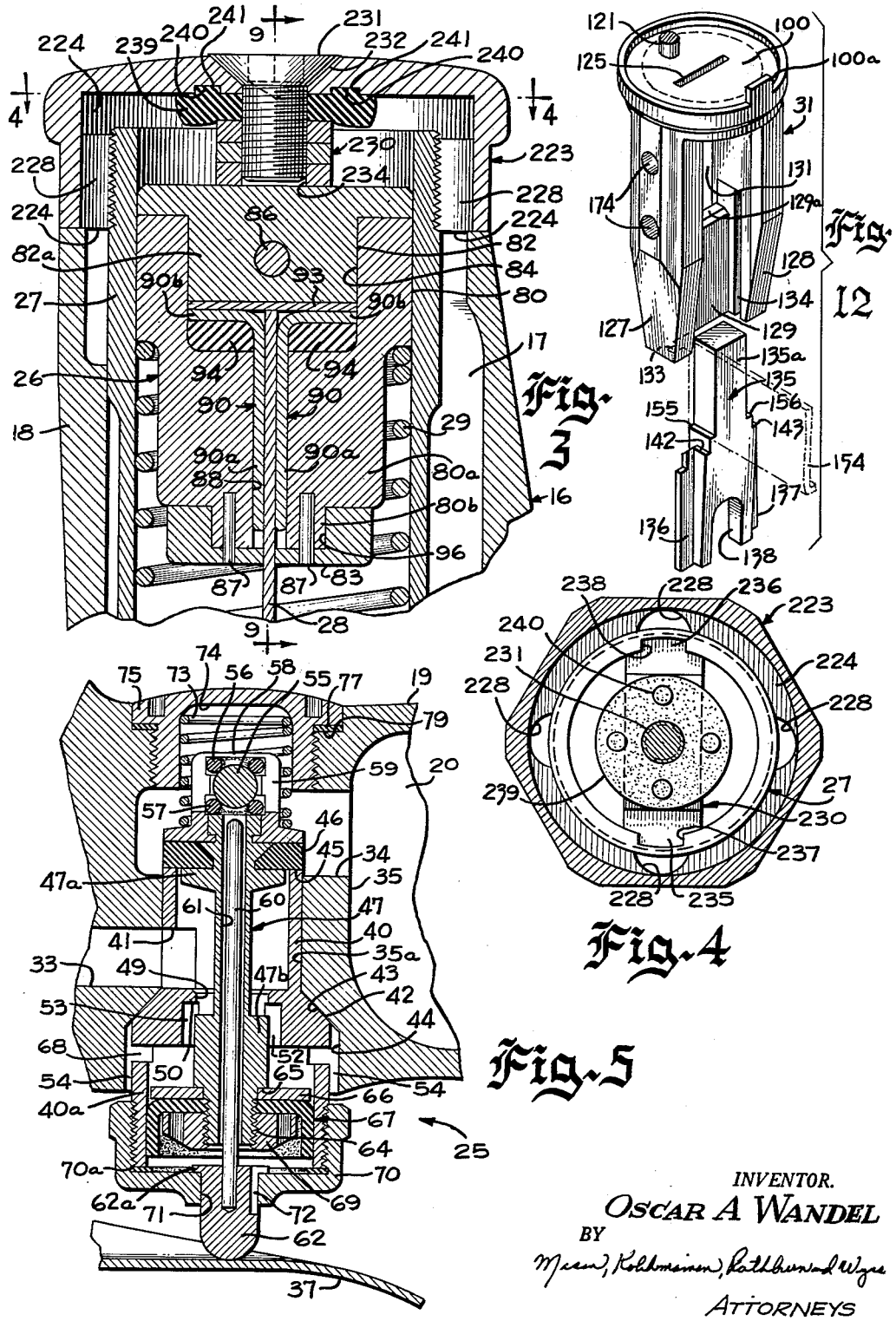

July 30, 1963
O. A. WANDEL
3,099,011
PNEUMATICALLY OPERATED TACKER
Filed Aug. 11, 1955
4 Sheets-Sheet 4
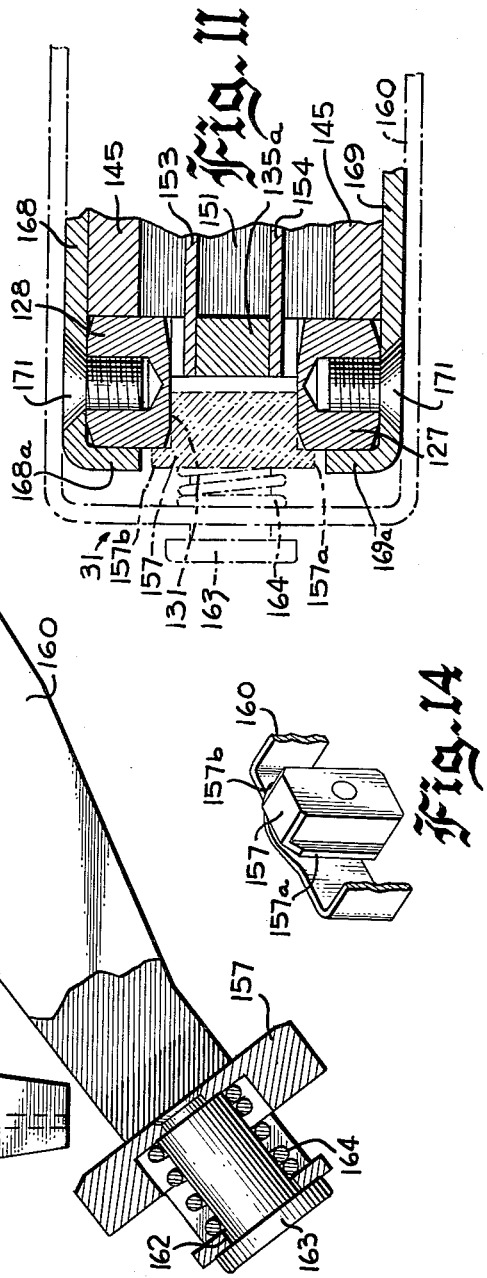
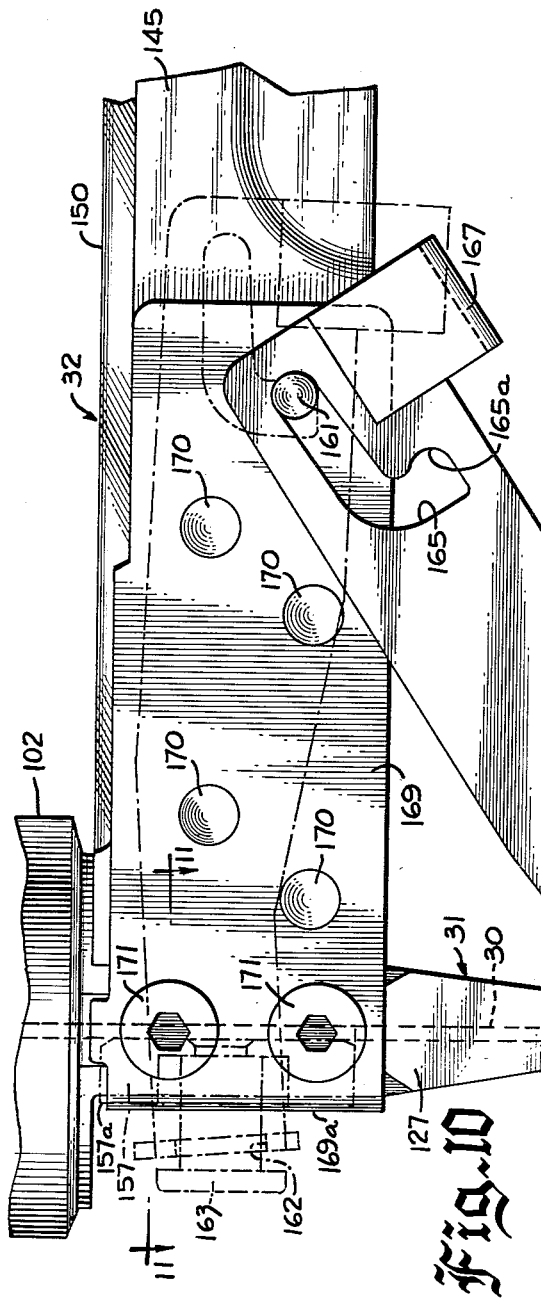
INVENTOR.
OSCAR A. WANDEL
BY
ATTORNEYS United States Patent Office 3,099,011
Patented July 30, 1963

3,099,011
PNEUMATICALLY OPERATED TACKER
Oscar A. Wandel, Mundelein, Ill., assignor to Fastener Corporation, Chicago, Ill., a corporation of Illinois
Filed Aug. 11, 1955, Ser. No. 527,697
17 Claims. (Cl. 1—44.4)

The present invention relates to pneumatically operated tackers and, more particularly, to pneumatically operated tackers of the type employed for many purposes, such as securing upholstery to furniture and the interior of automobiles, attaching roofing and siding to buildings, and for many other purposes.

Although tackers which are operated by compressed air have long been known in the art and are used for many different purposes, the various devices of the prior art have left much to be desired both in the way of ease and reliability of operation and in economy of manufacture and maintenance. Moreover, such tackers have not heretofore been satisfactory for driving long staples such as ¾", ⅞" or one inch in length.

Therefore, an object of the present invention is to provide a new and improved tacker of the type employing compressed air for driving relatively long securing devices into a body.

Another object of the present invention is to provide a tacker having a new and improved trigger-operated pilot valve for selectively supplying high pressure air to a driving chamber for forcing securing devices into a body.

Still another object of the present invention is to provide a tacker having a new and improved drive piston and driver blade assembly for insuring long blade life and reliable tacker operation.

A further object of the present invention is to provide a tacker having an improved locking mechanism for preventing spurious removal of a cover member from the tacker housing.

A still further object of the present invention is to provide a tacker having a new and improved nose structure for guiding securing devices from a magazine to a workpiece.

A further object of the present invention is to provide a tacker having a new and improved magazine structure enabling the facile and rapid supplying of securing devices thereto.

Briefly, the above objects are realized in accordance with the present invention by providing a pneumatically operated tacker, comprising a cast housing having an air reservoir in its handle connected through a passageway to a drive chamber in which a drive piston and cylinder are disposed, and a channeled nose structure which depends from the housing beneath the driving chamber for selectively guiding staples from a magazine to a workpiece of time the piston is forced downwardly to thrust a driver blade through the channel in the nose structure. An improved, easily actuatable trigger-operated valve is disposed in the passageway between the reservoir and the drive chamber, and resilient buffer means are provided for reducing impacts in the driver blade and piston thereby to increase the operating efficiency of the tacker. Furthermore, improved means are provided for enabling ready access to the drive chamber for servicing of the driver portion of the tacker and for enabling access to the channel in the nose structure and to the chamber in the magazine.

The invention, both as to its organization and method of operation, together with further objects and advantages thereof, will best be understood by reference to the following detailed description taken in connection with the accompanying drawings, in which:

FIG. 1 is a side elevational view of the tacker of the present invention with certain portions of the structure being removed to show the working parts of the tacker;

FIG. 2 is an enlarged fragmentary sectional view of the apparatus of FIG. 1 taken along the line 2—2 thereof, assuming FIG. 1 shows the complete structure;

FIG. 3 is an enlarged sectional view of the upper portion of the drive chamber showing the piston structure and apparatus for locking a cover in engagement with the housing;

FIG. 4 is a sectional view somewhat reduced in size of the structure of FIG. 3, taken along the line 4—4 thereof, assuming FIG. 3 shows the complete structure;

FIG. 5 is an enlarged sectional view of the pilot valve and trigger mechanism of the device shown in FIG. 1;

FIG. 6 is an exploded perspective view of the driver blade and the associated sturcture utilized to secure it within the piston;

FIG. 7 is a fragmentary, enlarged perspective view of the right-hand end of the staple magazine as shown in FIG. 1;

FIG. 8 is a perspective view of the piston guide cylinder showing the locking plate secured in the upper portion thereof;

FIG. 9 is a fragmentary sectional view of reduced size of the device of FIG. 3 taken along the line 9—9 thereof, again assuming FIG. 3 shows the complete structure;

FIG. 10 is an enlarged elevational view of the nose structure and feed end of the magazine of the device of FIG. 1, showing two positions of a release mechanism;

FIG. 11 is a fragmentary sectional view of the device of FIG. 10 taken along the line 11—11 thereof;

FIG. 12 is an exploded perspective view of the nose piece and a portion of the magazine of the tacker of FIG. 1;

FIG. 13 is an enlarged sectional view of the structure of FIG. 1 taken along the line 13—13 thereof; and FIG. 14 is a perspective view of a portion of the nose and magazine structure.

Referring to the drawings, and more particularly to FIG. 1 thereof, there is shown a pneumatically operated tacker 15 comprising a cast housing 16 having a drive chamber 17 defined by the hollow cylindrical portion 18 of the housing 16 and a rearwardly extending handle 19 having provided therein a reservoir 20 and an intake port 21, which is conventionally tapered and threaded for accommodating a fitting 22 connected to an air hose 23. A trigger-operated valve assembly 25 is mounted in the handle 19 intermediate the reservoir 20 and the drive chamber 17 for selectively admitting air behind a drive piston 26 slidably mounted in a guide cylinder 27 which is rigidly secured within the chamber 17. A staple driver element 28 is secured to the front end of the piston 26 so that upon admission of air into the chamber 17 by operation of the valve 25, the piston 26 is urged downwardly through its guide cylinder 27 against the resilient force of a coil spring 29 so that the driver element 28 engages a staple which is moved into a channel 30 in a nose structure 31 by a spring loaded staple magazine assembly 32, thereby to drive the engaged staple through the guide channel 30 into a workpiece located beneath the nose of the tacker 15.

To provide a lightweight tacker 15, the housing 16 preferably consists of a casting of aluminum having the generally hollow cylindrical portion 18 at the front end thereof and the handle portion 19 which extends rearwardly from the cylindrical portion 18. The bottom 19a of the handle 19 is concave to facilitate gripping of the tacker 15 by the hand of the user, and for this same purpose the inlet port 21 is provided at the rear end of the handle 19. Near the inner end of the handle 19 there are defined within the casting a pair of offset passageways 33 and 34, the passageway 33 extending toward the handle from the drive chamber 17, and the passageway 34 extending from the reservoir 20 toward the body portion of the housing 16. Effectively these passageways are defined in a wall portion 35 separating reservoir 20 and chamber 17.

In order selectively to connect the passageways 33 and 34 so as controllably to provide a communicating passageway between the reservoir 20 and the chamber 17, the valve 25 is supported within the wall 35 in a suitable opening 35a defined therein which may be a drilled opening having its longitudinal axis parallel to the corresponding axis of the chamber 17. This drilled opening in the wall 35 is illustrated as intercepting both of the transverse passageways 33 and 34. With this arrangement, in one position of the valve 25, the open position, the reservoir 20 is connected to the chamber 17, and in the other position of the valve 25, the closed position, the chamber 17 is isolated from the reservoir 20.

For the purpose of providing a readily actuatable valve, the valve 25 is preferably of the pilot type. Referring particularly to FIGS. 1 and 5 of the drawings, valve 25 may be actuated by means of a trigger 37 pivotally mounted beneath the handle 19 to a lug 38 integral with housing 16 by meant of a pivot pin 39. As illustrated, valve 25 comprises a sleeve 40 which is press fitted into the opening 35a provided in wall 35. Sleeve 40 includes an aperture 41 aligned with the passageway 33 leading to the drive chamber 17. Accurate positioning of the sleeve 40 in the opening 35a in wall 35 is facilitated by an annular conical shoulder 42 which is provided intermediate the ends of the sleeve 40 on the enlarged lower portion thereof for engagement with a corresponding conical shoulder 43 at the top of the enlarged lower end 44 of the opening 35a. The upper end of the sleeve 40 is open and connects with passageway 34.

To close the open upper end of the sleeve 40 which effectively defines an annular valve seat 45, there is provided a main valve member including a resilient washer 46 and a supporting valve stem 47. It will be apparent that the drive chamber 17 is isolated from the reservoir 20 whenever the main valve member is seated on the valve seat 45 as shown in FIG. 5 of the drawings. On the other hand, the valve is open when the main valve member is moved away from the seat 45, which means upward movement as viewed in FIG. 5 of the drawings.

To control and guide the movement of the main valve member, the intermediate portion of the valve stem 47 of small cross section connects an enlarged upper portion 47a supporting the resilient washer 46 with an enlarged cylindrical portion 47b provided near its lower end for slidable reception in a circular guideway 49 provided by an inwardly extending annular flange 50 defined in the sleeve 40. When the main valve is closed as shown in the drawings, the portion 47b is below guideway 49 so that a vent to atmosphere is provided in this condition of valve 25 for chamber 17. To complete this vent, a pair of diametrically opposed slots 52 and 53 are provided in the sleeve 40 below the flange 50 so that when the main valve member is in the closed position the passageway 33 is connected to atmosphere through aperture 41, sleeve 40 and ports 52 and 53, which connect with an annular space surrounding the lower end of sleeve 40 intermediate the sleeve 40 and the wall of the bore 35a at the enlarged lower end 44 thereof.

It will be apparent that high pressure air from reservoir 20 acts on the main valve member to maintain sealing engagement with valve seat 45. To open the main valve a sufficient upward force must be exerted on the valve stem 47 to overcome the force exerted downwardly thereon by the high pressure air in the reservoir 20. Since the pressure differential which thus obtains across the main valve member of valve 25 is exceedingly high, to provide for easy operation thereof with a minimum force, means are included in the valve for equalizing the pressure on the main valve member when opening of the valve is desired. To this end there is provided a pilot valve for permitting neutralization of the forces due to air pressure which hold the main valve member closed. This pilot valve is illustrated as comprising a metal ball 55 disposed between a pair of resilient O-rings 56 and 57 supported in a hollow cap member 58 mounted on the portion 47a of the main valve member. The O-ring 57 thus provides a valve seat against which the ball 55 is urged by the resilient biasing force exerted thereon by the O-ring 56. In order to move the ball 55 out of engagement with its seating O-ring 57, an operating plunger 60 is loosely disposed in a longitudinal bore 61 defined in the valve stem 47. The lower end of the plunger 60 is provided with a trigger engaging member 62 fixed thereto, so that when the trigger 37 is pivoted against the trigger engaging member 62 the ball 55 is moved upwardly against the resilient force exerted thereon by the O-ring 56 so as to permit the air under pressure in the reservoir 20 to enter the hollow cap member 58 through a slot 59 provided therein. This air under pressure may pass through the bore 61 in valve stem 47. The bore 61 in the valve stem 47 thus serves to provide a guideway for the plunger 60 as well as a pathway for high pressure air between the passageway 34 and the lower portion of the valve assemly 25.

To utilize this pathway to neutralize the forces due to air pressure acting to hold the main valve member closed, the lower end of the valve stem 47 is threaded as indicated at 64 beneath a shoulder 65 so that there may be secured thereto a rigid cylindrical plate 66 and a cylindrical packing member 67 by means of a nut 69. Thus, there is effectively connected to the lower end of valve stem 47 a piston which is slidably mounted in a cylinder 40a, which is an integral extension of sleeve 40. The cylinder portion 40a extends into the bore 35a at the enlarged lower end 44 thereof, but a pair of diametrically opposed ports 54 are defined in wall 35 connected to bore 35a to permit air from ports 52 and 53 to vent to atmosphere through an aperture 68 in sleeve 40. To close the lower end of the cylinder defined by extension 40a, there is provided a cap member 70 threaded to the lower end of extension 40a. A sealing washer 70a may be provided between the cap 70 and extension 40a. To accommodate the trigger engaging member 62, cap member 70 is provided with an aperture 71 which closely fits around member 62. A flange 62a on member 62 limits its maximum downward movement when cap 70 is in place. In order to vent the high pressure air which reaches the cylinder in sleeve extension 40a when the parts are in the position shown in FIG. 5 of the drawings, the member 62 is provided with a longitudinally extending groove 72 extending only part-way along the length thereof. It will be observed that when the member 62 is moved upwardly a short distance, this groove 72 is no longer effective to vent the cylinder defined in sleeve extension 40a to atmosphere.

For the purpose of closing the main valve member, there is provided a valve closing spring 73 which is concentrically arranged with the cap member 58. The lower end of the spring 73 engages this cap member, which in turn is secured to the valve stem 47. The other end of the spring 73 is positioned in a downwardly directed recess 74 in a cover 75 threadedly received in the top of the opening 35a defined in wall 35. An annular resilient gasket 77 is provided intermediate the lower side of the flange on the cap 75 and a shoulder 79 which surrounds the upper end of the opening 35a so as to seal the reservoir 20 from the atmosphere.

The operation of the valve 25 will readily be understood in view of the detailed description included above. With the valve in the position shown in FIG. 5 of the drawings, the passageway 33 is vented to atmosphere, as is also the cylinder defined in sleeve extension 40a, the latter being vented through vent 72. Under these conditions, the air under pressure in reservoir 20 maintains the main valve member in the closed position against valve seat 45. Upon upward movement of trigger 37, the vent 72 is no longer effective to vent the cylinder beneath plunger 66—67, and the pilot valve comprising ball 55 is opened to permit high pressure air to enter the cylinder defined in sleeve extension 40a. Since the area of the plunger in this cylinder is greater than the area of the main valve member, the upward force on valve stem 47 is sufficient to overcome both the force of spring 73 and the forces due to air pressure acting to close the main valve. The main valve moves to open position and at the same time enlarged portion 47b of valve stem 47 closes the passageway to atmosphere defined by circular guideway 49, whereby high pressure air from reservoir 20 is permitted to reach passageway 33. Upon release of trigger 37, plunger 61 moves to the position shown, whereby vent 72 is effective to vent the cylinder in sleeve extension 40a, and whereby spring 73 will move the main valve member to the closed position.

Considering now the mechanism actuated by supplying air under pressure to drive chamber 17, reference should be made particularly to FIGS. 1, 3, 6 and 9 of the drawings. As illustrated, piston 26 comprises a multipart element including a cylindrical body structure 80 having a depending bifurcated portion 80a of reduced cross section, a flanged top member 82 and a bottom impact member 83. The cylindrical body structure 80 is provided with a pocket to define a cylindrical recess 84 for receiving the depending portion 82a of the top member 82 and for providing space for housing the securing means utilized to attach the driver blade 28 to the piston 26. A cylindrical pin 86 is disposed within aligned apertures in the body structure 80 and the top 82 to secure together the top and body portions of the piston 26. Also, a plurality of cylindrical pins 87 are disposed within aligned holes in the body structure 80 and the bottom impact member 83 properly to align these members which are subsequently welded together to define the piston 26. The depending portion 80a of the piston body 80 is provided with a vertically disposed slot 88 through which extends the driver blade 28 and in which are housed portions of the means employed to secure the blade 28 to the piston 26.

To secure the driver blade 28 to the piston 26, as best shown in FIG. 6 of the drawings, there are provided a pair of identical L-shaped members 90, each having a depending portion 90a whose width equals that of the blade 28 and a semicircular orthogonal flange portion 90b at the top thereof. A circular head member 93 is positioned on top of the flanges 90b of the members 90, and the assembled unit, which is welded together, is disposed in the piston body 80, as best shown in FIG. 3 of the drawings, with a pair of semicircular resilient cushion members 94 positioned intermediate the flanges 90b and the bottom of the recess 84 in body structure 80. The slot 88 is enlarged throughout an area displaced from the bottom of the body 80 for the accommodation of the side members 90. A cylindrical protrusion 80b is centrally disposed on the bottom of the piston body 80 for reception in a cylindrical recess 96 in the top surface of the bottom cover or impact member 83.

The piston and blade assembly of the tacker 15 thus provides a driver unit wherein the blade 28 may readily be replaced when necessary merely by removing pin 86 and top member 82, and which providees cushioning means to prevent impacts which are exerted on the bottom of the piston at the termination of its work stroke from being transmitted directly to the blade 28 with the consequent embrittlement thereof. The piston 26 is reciprocally movable within cylinder 27, and, as will be more apparent from the following description, air under pressure is supplied to the upper end of cylinder 27 to actuate piston 26 downwardly when valve 25 is actuated.

Tackers are commonly provided with nose pieces into which staples to be driven are fed, where they can be engaged by the driver blade 28. Referring to FIGS. 1 and 12 of the drawings, the nose piece 31 is illustrated as being provided with a circular portion 100 at its upper end arranged to be axially aligned with the bottom of the piston guide cylinder 27, which latter is externally threaded as illustrated. In order to secure the nose piece 31 to the cylinder 27, a coupling nut 101 threadedly engages the lower threaded end of the cylinder 27. This nut is provided with an inwardly directed annular flange 102 which engages an annular flange 103 on the nose piece 31 thereby to permit clamping the nose piece to the cylinder 27 in axially aligned relationship.

In order to provide a cushion resiliently to stop the piston near the termination of its work stroke as it approaches the nose piece 31, a buffer 104 is supported on top of the nose piece 31 and extends into the lower portion of the guide cylinder 27 when the nose piece is secured thereto. The buffer 104 comprises a sleeve 105 having an outwardly directed lower flange 105a. The sleeve 105 is spaced sufficiently from cylinder 27 to provide an annular space for piston return spring 29 which has its lower end engaging flange 105a and its upper end engaging piston 26. The portion 80a of piston 26 is received within coiled spring 29, whereby the spring 29 is accurately positioned, both top and bottom. The piston 26 is urged upwardly in the cylinder 27 away from the nose piece 31 by the spring 29, and at the same time the sleeve 105 is held against the top of the nose piece 31. The cushioning means is provided by a pair of solid cylindrical resilient members 107 and 108, one housed above the other within the sleeve 105 separated by a thin metallic disk 109. These members 107 and 108 may be formed of rubber or synthetic rubber. A cylindrical or sleevelike shim 110 is wedged firmly between the edges of the disk 109 and the inner wall of the sleeve 105 to hold the resilient cushion members 107 and 108 in a fixed position. As shown, annular recesses 111 and 112 are provided in the respective bottom and top walls of the resilient cylinders 107 and 108 for the accommodation of the shim 110.

To accommodate the driver blade 28, the cylinder 107, the disk 109, the cylinder 108, and the cylindrical portion 100 of the nose piece 31 are provided with aligned elongated slots 114, 115, 116 and 125, respectively. If desired, the member 100 may be provided with a hardened insert (not shown, but indicated by dotted lines in FIG. 12 of the drawings) surrounding and including the slot 125 to insure a minimum amount of slot wear due to blade movement therethrough. Additionally, the elements 107, 108 and 109 are also provided with respective circular apertures 117, 118 and 119 displaced from the elongated slots 114, 115 and 116 and parallel thereto for the reception of a cylindrical positioning pin 121 which is press fitted into an aperture 122 in the top of the nose piece 31. To make sure that pin 121 does not interfere with the cushioning action of the resilient members 107 and 108, it does not extend to the top of member 107 and, in fact, is sufficiently short so that the maximum downward movement of piston 26 causing compression of resilient members 107 and 108 is short of the top of positioning pin 121. This resilient opposition to the downward movement of the piston 26 provides a cushion or buffer action so as to prolong the lives of the piston 26 and the driver blade 28. Moreover, with this arrangement the blade 28 will be sure to drive home the staples without normally extending beyond the lower end of the nose piece 31 during its work stroke. In order to hold the buffer 104 in assembled relationship, the lower end of the bottom cylindrical resilient member 108 is provided with an outwardly extending annular flange which generally conforms to the inner wall of the sleeve 105 in this same location thereby to prevent movement of the cushions 107 and 108 upwardly within the sleeve 105.

For the purpose of supplying staples to the nose piece 31 to be driven by the blade 28, the nose piece 31 includes a depending magazine support and staple guide means which consists of a pair of depending spatially arranged side support or depending leg members 127 and 128 integral with the portion 100, which side support members 127 and 128 are interconnected near the bottom thereof by a rectangular plate 129. The plate 129 may be integral with members 127 and 128, or for manufacturing purposes may be separately made and then secured in place. The top 129a of the plate 129, together with the inner walls of the members 127 and 128 and the lower face of the cylindrical portion 100 of the nose piece 31, defines a rectangular magazine receiving opening designated in the drawings as 131, the purpose of which will become more apparent from the ensuing description. The face of the plate 129 toward the right, as viewed in FIG. 1 of the drawings, is aligned with and in fact defines the lower portion of what might be termed the forward edge of the slot 30 through which the driver blade 28 moves. When the piston 26 is forced downwardly, the driver blade 28 passes through the slot 30 and slides past this face of the plate 129, which might be termed the rearward face. It will be appreciated that the nose piece 31 should preferably be orientated in a predetermined manner with the cylinder 27, and to this end the circular portion 100 is provided with one or more lugs 100a cooperating with corresponding notches 124 in the lower edge of cylinder 27.

For the purpose of insuring alignment of the nose piece 31 and the magazine assembly 32, there are provided, one in each upright or leg member 127 and 128, grooves designated as 133 and 134, respectively, which grooves are disposed parallel to the rearward face of the plate 129 and spaced therefrom a distance slightly greater than the thickness of the driver blade 28. These grooves are provided to receive the oppositely disposed outwardly directed ribs 136 and 137, respectively, of a channel defining member 135 comprising an end portion of the magazine assembly 32. The member 135 is shown in FIG. 12 separated from the magazine assembly to which it is normally secured. When secured to the magazine it is adapted to be positioned between the upright members 127 and 128, with the ribs 136 and 137 received in the respective grooves 133 and 134. In this manner the member 135 is accurately positioned with respect to the nose piece 31, and since the forward face of the member 135 is planar, a part of the guide channel 30 is defined between the rearward face of the plate 129 and the forward face of the member 135. Preferably the member 135 is formed of hardened material to insure a long wearing staple channel 30. As illustrated, the member 135 has an upstanding rectangular portion 135a to which a magazine is secured as by welding or the like. As best shown in FIG. 12 of the drawings, a plurality of upwardly facing shoulders 142 and 143 are provided on the member 135 for engagement with mating shoulders (not shown) in the upright members 127 and 128 at the top of the grooves 133 and 134 provided therein, thereby accurately to position the top of the upstanding portion 135a with respect to the bottom surface of the circular portion 100 of the nose piece 31. This positioning of member 135 insures a predetermined space between the bottom portion 100 and the top of portion 135a thereby to provide a horizontal slot in which staples may be supplied to the nose piece 31 and moved into channel 30. The member 135 is provided with a notch 138 at the bottom, through which a portion of the movement of the driver blade 28 may be viewed.

The magazine assembly 32, as best shown in FIGS. 7 and 11 of the drawings, includes in addition to the member 135 an elongated U-shaped channel or housing 145 having inwardly directed and oppositely disposed grooves 146 and 147 provided near the upper end of the respective sides thereof for slidably receiving the flanges 148 and 149 of an inverted U-shaped cover member 150. A U-shaped staple support and guide member 151 is nested in the U-shaped housing 145 and secured thereto with the bight portions thereof in abutment by any suitable means such as, for example, a plurality of rivets 152.

To provide a staple storage space, the upstanding legs of the guide 151, designated as 153 and 154, terminate at the distance below the adjacent portions of the cover 150, which is slightly greater than the thickness of the staples. Therefore, the staples may ride with their legs extending downwardly on the outward sides of the portions 153 and 154 of the guide 151 and with their bight portions positioned across the space between the legs 153 and 154. It will be understood that the spacing between the portions 153 and 154 will depend upon the size of the staples to be driven. In any event, one end of the U-shaped staple guide 151 is secured to the member 135. Preferably the sides 153 and 154 extend slightly beyond the bight portion of the guide 151 which abuts against the member 135. These extensions of the sides 153 and 154 preferably rest on shoulders 155 and 156 (FIG. 12), respectively, defined on the member 135, which are intermediate the upstanding portion 135a and the body portion thereof. The member 135 is welded or otherwise secured to the extension of the sides 153 and 154 so as to become an integral part of the magazine assembly 32 which may be assembled to the nose piece 31 by inserting extensions 136 and 137 in slots 133 and 134, respectively. With this arrangement, the member 135 and the forward edges of the arms 153 and 154 define the rearward wall of the guide channel 30 in the nose piece 31, so that as the staples are urged forwardly over the guide piece 151 to the end thereof, the leading staple moves directly beneath the slot 125 in the circular member 100 forming a part of nose piece 31 for engagement by the driver blade 28 as it is urged downwardly during the work stroke of the piston 26.

As was mentioned above, the magazine assembly is supported from the nose piece 31 of the tacker 15 by virtue of the fact that the guide member 151 is secured as by welding to the upstanding portion 135a of the member 135. Since the housing 145 is secured to the guide member 151 as by rivets 152, the magazine assembly 32 is held together and supported from the nose piece 31 due to the interrelated portions of the nose piece 31 and magazine assembly 32 comprising cooperating elements 133–136 and 134–137. To further secure these members 31 and 32 together, there are provided a pair of clamping plates 168 and 169 which are disposed on opposite sides of the magazine housing 145. The plates 168 and 169 extend forwardly of the housing 145 with the forwardly extending ends 168a and 169a being inturned so as partially to wrap around the forward faces of the upright members 127 and 128 of the nose piece 31, as best shown in FIG. 11 of the drawings. These plates are secured to the housing 145 by fastening means such as rivets 170, and are secured to the nose piece 31 by screws 171. Preferably the rivets 170 and screws 171 are flush with the outside surfaces of the clamping plates 168 and 169. In this manner, the magazine assembly 32 including the member 135 are rigidly secured to the nose piece 31, which latter is secured to the housing 16, as described hereinafter, in a manner to facilitate the disassembly of the over-all tacker for normal maintenance, inspection and replacement of parts.

With the arrangement described thus far, all of the means defining the wall of channel 30 beneath the member 100 of the nose piece 31 and to the right, as viewed in FIG. 1 of the drawings, have been described. The opposite wall of the lower portion of channel 30 is defined by plate 129. However, a forward portion of this channel has not been defined. To complete the forward portion of this channel so as to provide a stop against which the staples are urged as they move from the magazine 32 into channel 30, thereby to insure that the foremost staple is positioned directly beneath the slot 125 and also to provide an arrangement so that in the event the staples become clogged in the channel 30 in the nose piece 31 access thereto may readily be obtained, there is provided a readily removable wall portion 157. This wall portion 157 is really a generally rectangular plug 157 capable of being removably positioned in the forward side of the opening 131 with the planar rearward face of the plug 157 being spaced from the forward face of the member 135 by a distance equal to the width of the slot 125 thereby to complete the upper forward wall portion of the channel 30 between the rearward face of the plug 157 and the forward face of the upstanding portion 135a of member 135 through which staples can be driven by the driver blade 28. In order accurately to accomplish this spacing between the plug 157 and the member 135, a pair of oppositely disposed vertical flanges 157a and 157b are provided on the sides of the plug 157 for engagement with the forward faces of the upright members 127 and 128. By controlling the spacing between the rearward faces of the flanges 157a and 157b and the rearward face of the plug 157, this spacing may be accurately maintained.

For the purpose of supporting plug 157 for ready removal or "jiffy release," as it is termed, relative to its position within opening 131, it is illustrated in FIGS. 1, 2 and 10 of the drawings as being supported at the center of the bight portion of a pivotally and slidably disposed U-shaped support member 160. This U-shaped support member 160 has the ends of the legs thereof pivoted about a pair of trunnions projecting from the side walls of the housing 145 and extending through aligned openings in side plates 168 and 169. To accomplish this, the U-shaped support 160 is provided with an aperture 162 in the bight portion thereof for reception of a headed stud 163 which is secured at its inner end to the plug 157 as by riveting, welding or any other suitable means. The aperture 162 has a larger diameter than the body portion of the stud 163 so that the stud 163 is loosely received therein. In order resiliently to bias the plug 157 away from the bight portion of the support 160, a coiled spring 164 is disposed intermediate the forward face of the U-shaped support 160 and the forward face of the plug 157. Therefore, when the support 160 is moved in a direction to bring the bight portion thereof close to the nose piece 31 and specifically the opening 131 therein, the flanges 157a and 157b of plug 157 are resiliently urged by the coiled spring 164 into engagement with the forward faces of the upstanding members 127 and 128 thereby causing plug 157 to define a portion of slot 30. However, when the U-shaped member 160 is moved so that the bight portion thereof moves away from the nose piece 31, plug 157 is moved out of engagement with the nose piece 31 thereby to expose the opening 131 to facilitate ready removal of jammed staples by means of a screw driver or similar tool.

In order to permit bodily movement of the U-shaped support member 160 in addition to pivotal movement about trunnions 161, and further to lock it in its rearward position during normal use of the tacker 15, an L-shaped slot 165 is provided in each leg to receive therein the trunnions 161. These L-shaped slots 165 are disposed with the long leg of the L horizontal, as viewed in the dashed line position in FIG. 10 of the drawings, and the shorter leg extending downwardly. These downwardly extending portions of the slots 165 have a circular portion 165a extending in the same direction as the long leg of the L for engagement with the trunnions 161 effectively to lock the support 160 in its dashed line position shown in FIG. 10, with the plug 157 in channel defining or closed position. It will be appreciated that the force produced by spring 164 will hold the trunnions 161 in the portions 165a of L-shaped slots 165. When it is desired to remove the plug 157 from the slot 131, the U-shaped member 160 may be moved slightly to the right, as viewed in dashed lines in FIG. 10 of the drawings, to release the trunnions from the portions 165a of L-shaped slots 165. Thereafter the trunnions 161 may be moved along the longer legs of the L-shaped slots 165, whereby the plug 157 may be moved free of the nose piece 31, and the U-shaped member 160 may be tilted forwardly and downwardly to the position shown in solid lines in FIG. 10 of the drawings. In order to facilitate moving the U-shaped member 160 into and out of its locked position, a U-shaped connecting member 167 is bridged across the legs of U-shaped member 160 so that it extends across the bottom of the magazine assembly 32 to provide a convenient means for enabling the use of the hand to move the U-shaped member 160 into locked position and the use of a screw driver or other tool to move it out of such locked position by inserting the tool intermediate the bottom of the housing 145 and the top of the connecting member 167.

It will be appreciated that means must be provided to move staples to be driven by driver blade 28 into channel 30. To this end there is provided in magazine assembly 32 an elongated coiled tension spring 182. In order to provide a relatively constant force on the staples irrespective of the number of staples contained in the magazine assembly 32, one end of the spring 182 is attached to an upstanding struck-out finger (not shown) in the bottom of the guide member 151, and the spring 182 is arranged in a sort of Z configuration by extending over a pair of spaced sheaves 184 and 185 located substantially one at either end of guide member 151. As illustrated, sheave 184 is rotatable about a stud 186 extending between the legs 153 and 154 of U-shaped guide member 151 at a point remote from nose piece 31, while sheave 185 is rotatable about a stud 186 also extending between legs 153 and 154 of member 151 adjacent nose piece 31. The other end of spring 182 is connected to a pusher plate 188, which is slidably received between the magazine cover 150 and the top of the guide member 151. This tension spring 182 continually urges pusher plate 188 to the left, as viewed in FIG. 1 of the drawings, to move any staples in magazine assembly 32 toward channel 30. As shown, the pusher plate 188 is a U or channel-shaped member which rides over the U-shaped guide piece 151 rearwardly of the staples so as to force them forwardly into engagement with the rearward face of the plug 157. This pusher plate 188 is disposed beneath the cover 150, which is held in raised position by the grooves 146 and 147 so as not to interfere with movement of the staples or the pusher plate 188. The space for the staples and pusher plate is readily visible in FIG. 7 of the drawings between cover 150 and the top of the legs 153 and 154 of U-shaped guide piece 151.

In order to prevent the pusher plate 188 from moving into the path of the driver blade 28 after the last staple has been driven, a slotted guideway 189 is provided along the length of the magazine cover 150 for slidably receiving an upstanding struck-out finger 188a (FIG. 2) on the pusher plate 188. The finger 188a and the forward end of the slot 189 in cover 150 are so positioned that when the forward end of the plate 188 is in alignment with the rearward edge of the channel 30 in the nose piece 31, as shown in FIG. 1 of the drawings, the finger 188a engages the forward edge of the slot 189, thereby to limit the forward movement of the plate 188 to a position insuring that all staples in the magazine 32 can be driven.

For the purpose of simplifying the process of loading magazine assembly 32 with staples, the rearward end of the cover 150 is provided with an upwardly bent-over handle portion 191 which is preferably integral with cover 150. In order to prevent the cover 150 from moving rearwardly of the housing 145 during normal operation of the stapler, or in the other words to keep the cover closed, a pair of struck-out bosses or latch members 195 and 196 are provided in the cover 150 near the handle portion 191 for engagement with a cross bar or detent 197 held between the upstanding legs 198 and 199 of a U-shaped detent support member 200. Preferably the housing 145 is provided with a pair of grooves 201 and 202 arranged on opposite sides thereof for the accommodation of the side arms of the U-shaped support member 200. Also, a rectangular slot 203 is provided in the bottom of the housing 145 communicating with the slots 201 and 202 for the accommodation of the bottom portion of the detent support member 200. A circular aperture 204 is provided in the bottom of the slot 203 in the housing 145 and communicates with a cylindrical recess 205 in the bottom portion of the guide piece 151 for accommodating a coil spring 206 having one end thereof abutting against the bottom of the recess 205 in the guide piece 151 and the other end received in a circular recess 207 in the inner face of the bight portion of the U-shaped detent support 200. Thus the U-shaped detent support 200 and associated detent 197 are biased into latching engagement with bosses 195 and 196. Consequently, undesirable rearward movement of the cover 150 in the housing 145 is prevented. However, when it is desired to slide the cover 150 rearwardly so as to expose the chamber in the magazine thereby to facilitate the insertion of staples therein, the U-shaped support member 200 may readily be urged upwardly by the fingers of the operator so as to move the detent 197 out of engagement with the bosses 195 and 196 thereby to permit rearward movement of the cover 150.

It will be understood that the cover 150, which may be slidably moved rearwardly of the housing 145 so as to expose the chamber in the magazine assembly 32, is continually urged to the closed position by spring 182, which transmits its tensile force to cover 150 through pusher plate 188 and finger 188a engaging one end of slot 189. It would be desirable to latch cover 150 in the open position and to this end there are provided two sets of spatially arranged struck-out bosses 210 and 211. As is best shown in FIGS. 1 and 2 of the drawings, the rearward bosses 210 are provided with a rearward incline so as to facilitate rearward motion past the detent 197 and into latching position therewith without the necessity of first pushing the U-shaped support member 200 upwardly against the force exerted thereon by the coil spring 206. However, when the cross bar 197 snaps past the end of the bosses 210, it snaps into the space provided between the bosses 210 and 211 so that further rearward movement of the cover 150 is prevented except by pressing the U-shaped support member 200 upwardly against the spring 206 out of engagement with the bosses 211.

With the above-described arrangement, the magazine assembly 32 can readily be secured to the nose piece 31 and the latter, in turn, secured to the cylinder 27. To secure the assembly to the rest of the tacker 15, the guide cylinder 27 is disposed within the drive chamber 17 and positioned therein by means of an annular shoulder 216 provided on the exterior of cylinder 27 for abutting against a rabbet 215 defined in housing 18. In order to maintain the nose piece 31 and the magazine assembly 32 in proper orientation with respect to the cylindrical housing portion 18 so that the magazine lies in substantially the same plane as the handle 19, a boss 220 is provided on the housing 16 directly beneath the lug 38 which supports the trigger 37. This boss is provided with a downwardly directed slot 219 for receiving a rectangularly headed pin 218 which is press fitted into an aperture in the cylinder 27. Thus, as the cylinder 27 is moved into chamber 17 from the bottom proper orientation thereof is assured by the pin 218 entering the slot 219 until the shoulder 216 abuts the rabbet 215. To prevent the nut 101 from coming loose, a plurality of set screws 221 are provided which extend through the nut 101 into engagement with the cylinder 27.

To hold the cylinder 27 in a fixed position within the chamber 17 such that shoulder 216 engages the rabbet 215, there is provided a generally cylindrical drive chamber cap 223 which has an inwardly directed annular flange 224 near the lower end thereof for defining an aperture 225 which is internally threaded for mating with the external threads 227 provided at the top of the guide cylinder 27. A plurality of semicylindrical recesses 228 (FIG. 4) are spatially arranged in the flange 224 of the cap 223 to provide passageways around the top of the cylinder 27 through which the high pressure air from passageway 33 which reaches chamber 17 may enter the cylinder 27 above the piston 26.

In order to prevent spurious removal of the cap 223 from the housing 16 due to the inherent vibration of the tacker 15 during normal operation thereof and to provide a buffer against which the piston 26 abuts at the end of its return stroke, a rectangular locking plate 230 is secured to the top of the cap 223 by means of a conically-headed screw 231 which is received in a chamfered aperture 232 in the cap 223 and which is threadedly received in a threaded bore 234 in the locking plate 230. The locking plate 230 is provided with a pair of oppositely directed rectangularly shaped protrusions 235 and 236 which are slidably received in oppositely disposed slots 237 and 238 provided at the top of the guide cylinder 27. These slots may, of course, be notches extending through the entire cylinder wall, if desired. As thus far described, it will be seen that relative rotation between the locking plate 230 and the cylinder 27 is prevented by the coaction of the protrusions 235 and 236 with their respective notches 237 and 238, and therefore any relative rotation between the cap 223 and the housing 16 can only take place by relative movement of the cap 223 and the locking plate 230. Consequently, so as to prevent such relative movement and further to provide a resilient cushion against which the piston 26 abuts at the end of its return stroke, an annular resilient member 239 is interposed and slightly compressed between the top of the locking plate 230 and the bottom of the cover 223 by means of the screw 231 to provide a compressive force on the resilient member 239. Because of the relatively sharp edges at the top of the locking plate 230, angular rotation between the plate 230 and the resilient member 239 is prevented, and in order to prevent relative angular rotation between the cover 223 and the resilient member 239, a plurality of cylindrical protrusions 240 are provided on the top of the member 239 for reception in a plurality of cylindrical recesses 241 provided in the bottom of the cover portion or cap 223. It may thus be seen that the cover 223 is securely locked to the housing 16 and removal therefrom can only be accomplished by withdrawing the screw 231 from the locking plate 230.

In order to prevent spurious removal of the screw 231 from the locking plate 230, the central aperture in the cushion 239 is slightly smaller in diameter than the body portion of the screw 231. When the piston 26 is returned to its normal position by the spring 29 during its return stroke, the top portion of the piston 26 engages the bottom of the locking plate 239 thereby to force the locking plate 230 and the screw 231 upwardly to compress the cushion 239. Consequently, an ever increasing opposing force is applied to the piston to bring it to a stop without any sudden impact which, as is well known in the art, embrittles the driver blade thereby to shorten the life thereof.

In view of the detailed description included above, the operation of the tacker 15 of the present invention will readily be understood by those skilled in the art. This tacker will drive long staples, such as ¾", ⅞" and one inch staples. A very sturdy device is provided which is simple to operate and will give long years of satisfactory service.

While the invention has been described by means of a particular embodiment thereof, it will be understood that those skilled in the art may make many changes and modifications without departing from the invention. Therefore, it is intended in the appended claims to cover all changes and modifications which fall within the true spirit and scope of the invention.

What is claimed as new and desired to be secured by Letters Patent of the United States is:

1. In a pneumatically operated tacker, the combination of a two-part piston structure for slidable movement in a supporting cylinder, said parts being constructed such that in an assembled juxtaposed condition a recess is defined therebetween, means defining an aperture in one of said parts communicating with said recess, said aperture being parallel with the path of movement of said piston and said parts being interconnected along a surface transverse to said path, a driver blade extending into said recess through said aperture, that end of said blade which is disposed within said recess being enlarged so as to prevent withdrawal of the blade from the piston while said two piston parts are in an assembled condition, and resilient means interposed between said enlarged portion of said blade and said one of said piston parts, whereby an impact force imparted to one of said piston parts is not transmitted through said blade to said other piston part.

2. In a pneumatically operated tacker, the combination of a two-part piston structure for slidable movement in a supporting cylinder, means defining a recess intermediate said piston parts, means defining an aperture in one of said parts, said aperture communicating with said recess, a staple driver element extending through said aperture, coupling means on said element within said recess, and resilient means in said recess disposed between said coupling means and said one of said parts.

3. In a pneumatically operated tacker of the type having a driver element operatively secured to a pneumatically driven piston, stop means for limiting the stroke of said piston in its movement toward a work piece, and securing means for securing said driver element to said piston internally of said piston, said securing means comprising a resilient member for cushioning the shock transmitted to said driver element when said piston engages said stop means.

4. In a pneumatically operated tacker of the type having a driver blade operatively secured to a pneumatically driven piston, stop means for limiting the stroke of said piston in its movement toward a work piece, an internal recess in said piston, said blade extending through said piston into said recess, and resilient securing means for securing one end of said blade within said recess thereby to cushion the shock transmitted to said blade when said piston is engaged by said stop means.

5. A piston and driver blade assembly, comprising a substantially cylindrical structure having an axially apertured opening leading into an enlarged recess at one end thereof, a cylindrical member positioned within said recess and having an annular flange at one end thereof extending over and in engagement with said one end of said cylindrical structure so that an open space is defined by the walls of said recess and a portion of said cylindrical member, said driver blade having an enlarged portion disposed within said open space and a body portion extending outwardly from said cylindrical structure through said aperture, and a resilient member interposed between said enlarged portion of said blade and the bottom of said recess in said cylindrical structure.

6. In a pneumatic tacker having a reciprocably movable drive piston, the combination of a housing defining a drive chamber and having an opening therein at one end of said chamber, a cylindrical cover member threadedly secured to said housing over said opening, a locking plate having its ends disposed in a pair of elongated notches in said housing to prevent rotation of said plate with respect to said housing, said notches being parallel to the principal axis of said chamber and extending above the path of said piston in said chamber, a resilient member interposed between said plate and said cover, and separate means for supplying a compressive force between said plate and said cover to compress said resilient member, whereby said plate and resilient member provide a cushion for stopping said piston in its movement toward said cover while locking the cover to the housing to prevent spurious removal therefrom.

7. In apparatus of the type described, the combination of a housing having an opening therein surrounded by a threaded portion, a cover member having a threaded portion for engagement with said threaded portion of said housing, a locking plate having its ends disposed in a pair of notches in said housing to prevent rotation of said plate with respect to said housing, a resilient member interposed between said plate and said cover, and means for supplying a compressive force between said plate and said cover to compress said resilient member whereby said cover is attached to said housing.

8. A pneumatically driven tacker of the type having a drive piston movable in a hollow cylinder for reciprocating a driver blade for forcing staples into a work piece, the combination of a housing, a flanged sleeve mounted in said housing and positioned in the path of said piston, the inner diameter of said sleeve exceeding the outer diameter of the bottom of said piston, a coil spring interposed between the flange of said sleeve and said piston to bias said piston away from said work piece, and a cylindrical resilient bumper mounted wtihin said spring, said bumper having a central aperture for permitting reciprocable movement therein of said driver blade.

9. A tacker as set forth in claim 8 wherein said bumper comprises a plurality of resilient members, and a rigid plate interposed between said resilient members.

10. A buffer and stop means for a pneumatic tacker, comprising a sleeve, first and second resilient members supported within said sleeve, a rigid member disposed within said sleeve between said resilient members in juxtaposition therewith, each resilient member and said rigid member having a cross section corresponding to the internal cross section of said sleeve and a pair of spatially arranged apertures, one aperture in each member being adapted to slidably receive a tacker drive blade and the other aperture being adapted to receive a pin member.

11. In a pneumatically operated tacker, the combination of a housing having a drive chamber therein, said chamber being open at one end, a guide cylinder disposed within said chamber, a piston movable in said cylinder toward said open end, a cover secured to said cylinder over said open end in said chamber, and resilient means for locking said cover to said cylinder and for cushioning and stopping said piston in its movement toward said cover.

12. In apparatus of the type described, the combination of a housing, a cylinder removably supported in said housing, a piston slidable in said cylinder, a nose piece having a guide channel therein, a driver blade secured to said piston and slidably extending through said channel, said nose piece comprising a first portion secured to said cylinder and a second portion, said first and second portions being adapted to be slidably interfitted to define said guide channel, and a magazine secured to said second portion to be solely supported thereby, said magazine including fastener means for maintaining said first and second portions in interfitted relationship.

13. In a fastener-applying implement, a cylinder, a piston reciprocable in said cylinder, means to supply fluid-pressure to said cylinder to move the piston in one direction, a fastener-driver connected to said piston for reciprocation thereby, said fastener-driver constructed and arranged for limited movement in opposite directions axially of said piston, and a spring engaging directly with said piston independently of said fastener-driver without resistance to the axial movement of the driver relatively to said piston, said spring acting to return said piston to initial position after completion of its driving stroke.

14. A piston for accelerating a driver and adapted to be decelerated without affecting the motion of said driver, including, a piston body for operating in a cylinder and with a bottom, a driving head on the driver and engageable with the bottom of the body to be driven in one direction thereby, and means acting between the piston body and driving head and yieldingly urging the head into engagement with the said bottom of the body to be driven thereby, the said head being coupled to the piston body by said means.

15. A piston for accelerating a driver and adapted to be decelerated without affecting the motion of said driver, including, a disc shaped piston body for operating in a cylinder and with a bottom, an element depending from the body, a driving head on the driver and guided by said element and with a top engageable with the bottom of the body to be driven in one direction thereby, and means acting between said depending element of the piston body and the driving head and yieldingly urging the top of the head into engagement with the bottom of the body to be driven thereby, the said head being coupled to the piston body by said means.

16. A tool of the character described including, an elongate cylinder, a piston body for operation in the cylinder, a driving head engageable with the body to be driven in one direction thereby, means acting between the piston body and driving head and normally yieldingly positioning the head in engagement with the piston body to be driven thereby, the said head being coupled to the piston body by said means, and a snubber at one end of the cylinder for damping the piston body independently of the driving head.

17. A tool of the character described including, an elongate cylinder, a piston body for operation in the cylinder, an element depending from the body, a driving head guided by said element and engageable with the body to be driven in one direction thereby, means acting between said depending element of the piston body and the driving head and normally yieldingly urging the head in engagement with the piston body to be driven thereby, the said head being coupled to the piston body by said means, and a snubber at one end of the cylinder for damping the piston body independently of the driving head.

References Cited in the file of this patent
UNITED STATES PATENTS

| | | |
|---|---|---|
| 451,995 | Bradeen | May 12, 1891 |
| 1,014,639 | Colwell | Jan. 16, 1912 |
| 1,977,382 | Gruis | Oct. 16, 1934 |
| 2,109,203 | Spencer | Feb. 22, 1938 |
| 2,221,157 | Temple | Nov. 12, 1940 |
| 2,585,939 | Juilfs | Feb. 19, 1952 |
| 2,585,941 | Juilfs | Feb. 19, 1952 |
| 2,585,942 | Juilfs | Feb. 19, 1952 |
| 2,607,367 | Mapes | Aug. 19, 1952 |
| 2,671,214 | Juilfs | Mar. 9, 1954 |
| 2,707,277 | Aldrich | May 3, 1955 |
| 2,713,165 | Campbell | July 19, 1955 |
| 2,714,208 | Jenny | Aug. 2, 1955 |
| 2,727,235 | Cameron | Dec. 20, 1955 |
| 2,751,940 | Miller | June 26, 1956 |
| 2,774,968 | Osborne et al. | Dec. 25, 1956 |
| 2,821,170 | Jacobus | Jan. 28, 1958 |